(12) United States Patent
Lottin et al.

(10) Patent No.: US 8,949,966 B2
(45) Date of Patent: Feb. 3, 2015

(54) METHOD AND SYSTEM FOR PROTECTING A SERVICE ACCESS LINK

(75) Inventors: Philippe Lottin, Trebeurden (FR); Claudine Le Mercier, Ploubezre (FR); Jean-François Rey, Trebeurden (FR)

(73) Assignee: Orange, Paris (FR)

( * ) Notice: Subject to any disclaimer, the term of this patent is extended or adjusted under 35 U.S.C. 154(b) by 1832 days.

(21) Appl. No.: 12/084,337

(22) PCT Filed: Oct. 25, 2006

(86) PCT No.: PCT/FR2006/051103
§ 371 (c)(1),
(2), (4) Date: Oct. 14, 2009

(87) PCT Pub. No.: WO2007/048975
PCT Pub. Date: May 3, 2007

(65) Prior Publication Data
US 2010/0037298 A1    Feb. 11, 2010

(30) Foreign Application Priority Data

Oct. 26, 2005   (FR) ...................................... 05 10921

(51) Int. Cl.
*H04L 29/06*    (2006.01)
*H04L 29/12*    (2006.01)
*H04L 29/08*    (2006.01)

(52) U.S. Cl.
CPC ...... *H04L 63/0281* (2013.01); *H04L 29/12594* (2013.01); *H04L 61/301* (2013.01); *H04L 63/108* (2013.01); *H04L 65/1006* (2013.01);
(Continued)

(58) Field of Classification Search
USPC ................................................ 726/12, 2, 3, 11
See application file for complete search history.

(56) References Cited

U.S. PATENT DOCUMENTS 6,665,721 B1 * 12/2003 Hind et al. ..................... 709/227
7,137,143 B2 * 11/2006 Chawla et al. .................. 726/12
(Continued)

FOREIGN PATENT DOCUMENTS

EP        1 255 395        11/2002

OTHER PUBLICATIONS

N. Kew, "Running a Reverse Proxy with Apache", http://www.apacheweek.com/features/reverseproxies>, pp. 1-11, Jul. 6, 2004.
(Continued)

*Primary Examiner* — Bradley Holder
(74) *Attorney, Agent, or Firm* — Knobbe Martens Olson & Bear LLP

(57) ABSTRACT

A method and a system for securing access to data stored in a remote content server (41), and corresponding to personal multimedia data of a user (A) for example, which data is accessible by another user (B) from a terminal (2) by means of an electronic address. In order to avoid direct and extended access by the user (B) to the data of a user (A), the system also includes an application server (5) for creating an electronic masking address having a determined validity period and for sending to an inverse proxy server (6) said electronic masking address assigned to the electronic address of the remote content server (41). In this way, the terminal (2) of the user (B) temporarily accesses data stored in the remote content server (41) via the inverse proxy server (6) by means of the electronic masking address.

7 Claims, 4 Drawing Sheets

(52) U.S. Cl.
CPC .......... *H04L 65/1063* (2013.01); *H04L 65/105* (2013.01); *H04L 67/28* (2013.01); *H04L 29/06027* (2013.01); *H04L 69/329* (2013.01)
USPC ........................ 726/12; 726/2; 726/3; 726/11

(56) References Cited

U.S. PATENT DOCUMENTS

| | | | |
|---|---|---|---|
| 7,272,642 B2* | 9/2007 | Knight et al. | 709/218 |
| 7,409,439 B2* | 8/2008 | Raja et al. | 709/220 |
| 7,600,230 B2* | 10/2009 | Desai et al. | 719/311 |
| 7,650,392 B1* | 1/2010 | Goodwin | 709/219 |
| 7,693,992 B2* | 4/2010 | Watson | 709/226 |
| 7,840,707 B2* | 11/2010 | Jerrard-Dunne | 709/246 |
| 7,873,707 B1* | 1/2011 | Subramanian et al. | 709/219 |
| 7,966,219 B1* | 6/2011 | Singh et al. | 705/26.8 |
| 8,095,658 B2* | 1/2012 | Ashley et al. | 709/226 |
| 2002/0016911 A1* | 2/2002 | Chawla et al. | 713/153 |
| 2002/0120757 A1* | 8/2002 | Sutherland et al. | 709/229 |
| 2002/0161904 A1* | 10/2002 | Tredoux et al. | 709/229 |
| 2003/0061515 A1* | 3/2003 | Kindberg et al. | 713/201 |
| 2003/0115281 A1* | 6/2003 | McHenry et al. | 709/213 |
| 2003/0115346 A1* | 6/2003 | McHenry et al. | 709/229 |
| 2004/0044768 A1* | 3/2004 | Takahashi | 709/225 |
| 2004/0111491 A1* | 6/2004 | Raja et al. | 709/219 |
| 2004/0177318 A1* | 9/2004 | Raja et al. | 715/501.1 |
| 2004/0215741 A1* | 10/2004 | Watson | 709/217 |
| 2005/0076126 A1* | 4/2005 | Knight et al. | 709/227 |
| 2005/0091341 A1* | 4/2005 | Knight et al. | 709/218 |
| 2005/0154886 A1* | 7/2005 | Birk et al. | 713/168 |
| 2005/0251856 A1* | 11/2005 | Araujo et al. | 726/12 |
| 2005/0262357 A1* | 11/2005 | Araujo et al. | 713/182 |
| 2005/0273849 A1* | 12/2005 | Araujo et al. | 726/12 |
| 2006/0010442 A1* | 1/2006 | Desai et al. | 718/100 |
| 2006/0026286 A1* | 2/2006 | Lei et al. | 709/227 |
| 2006/0031442 A1* | 2/2006 | Ashley et al. | 709/223 |
| 2006/0041637 A1* | 2/2006 | Jerrard-Dunne | 709/219 |
| 2006/0200503 A1* | 9/2006 | Dosa et al. | 707/203 |
| 2006/0271671 A1* | 11/2006 | Hansen | 709/224 |
| 2007/0055930 A1* | 3/2007 | Jerrard-Dunne et al. | 715/523 |
| 2007/0061282 A1* | 3/2007 | Ganguly et al. | 707/1 |

OTHER PUBLICATIONS

Ericsson, "TLS based access security for IMS", 3GPP TSG SA WG3 Security, http://www.3gpp.org/ftp/tsg_sa/WG3_Security/TSGS3_37_Sophia/Docs/PDF/S3-050065.pdf>, pp. 1-42, Feb. 25, 2005.

* cited by examiner

METHOD AND SYSTEM FOR PROTECTING A SERVICE ACCESS LINK

RELATED APPLICATIONS

This is a U.S. National Phase Application under 35 USC 371 of International Application PCT/FR2006/051103, filed on Oct. 25, 2006.

This application claims the priority of French application no. 05/10921 filed Oct. 26, 2005, the entire content of which is hereby incorporated by reference.

FIELD OF THE INVENTION

The invention relates to providing secure access to data stored on a remote server and made accessible by broadcasting an access link (e.g. a URL address, an IP email address, etc.). It is concerned in particular with providing a called party with secure access to media or information relating to a calling party.

BACKGROUND OF THE INVENTION

An electronic address, for example of the URL (Uniform Resource Locator) type, is a universal naming format for designating the location of a resource (data, images, video, audio, etc.) on the Internet. It is sometimes important to protect direct access to resources.

For example, with an OIP (Originating Identification Presentation) service used during a call (voice, data), for example a Voice over IP (Internet Protocol) type telephone call, the called party can receive a multimedia identity card from the calling party. To this end, a link corresponding to an electronic address (e.g. a URL address) received by the called party gives access to the multimedia identity card of the calling party stored in the network directory of the calling party on a remote server that is accessible via this link. With no security precautions, knowing this address can enable the called party to consult the entire directory of the calling party (personal information and contacts) or even to modify or falsify the data in the directory.

To limit direct external attacks, a "reverse proxy" server can be used to mask the connection to the content server that really contains the resources. It serves as a relay between the client and the content server, making the content server invisible to the client. The reverse proxy server translates a URL address of the public network that it receives into a private URL address and transfers the content to the client as if it were itself responding to the request for that content sent by the client.

However, even with this solution, the called party or a third party has permanent access to the data in the directory of the calling party, which can then at least be copied and used by other services.

OBJECT AND BRIEF DESCRIPTION OF THE INVENTION

An object of the present invention is to remove the drawbacks referred to above and to propose a solution for the secure provision of multimedia contents for a limited time period defined either in advance or as a function of predetermined events.

This object is achieved by a method of providing secure access to data stored on a remote content server and accessible from a terminal by means of an electronic address (URL, email address, telephone number, IP address, etc.), the method being characterized in that it comprises the following steps:

a) a step of creating in a reverse proxy server and for a given validity period a masking electronic address associated with the electronic address of the remote server; and b) a step of the reverse proxy server communicating the masking electronic address to the terminal.

Thus the method according to an embodiment of the invention enables secure broadcasting of an electronic address (URL, email address, telephone number, IP address, etc.) providing access to multimedia resources (images, video, audio, etc.) or to personal information that is to be made available for a limited time period. The association of the masking electronic address and the electronic address of the content server that masks the real electronic address of the content server from the end user is effective for only a limited time period. The time for which the content is made available is therefore controlled.

The time period for access to data in the content server can be defined as a function of external events, in which case, step a) can in particular be initiated by a request to set up a communication session (e.g. an SIP type Voice over IP call request) to the terminal of the called party, the method further comprising a step c) of deactivating the masking electronic address in the reverse proxy server that can be initiated either after a predetermined time period (e.g. deactivating the masking electronic address two seconds after acceptance of the communication session by the called party) or following an event in the communications network, for example acceptance of a communication session (e.g. an SIP call) by the called party, or at the end of the communication session.

This makes it possible, in step a), for an OIP application server to react to the request to set up the communication session (e.g. to send a SIP call) sent by a calling party to the terminal of the called party by consulting a database linked to the content server in order to determine the electronic address of the identity data of the calling party that is to be sent to the terminal of the called party and by associating that electronic address with the masking electronic address, the two associated electronic addresses being sent to the reverse proxy server.

In this case, the method according to an embodiment of the invention: addresses the confidentiality of the personal information of the calling party available to the called party in the directory of contacts of the calling party (photos, contact details, etc.); avoids copying of content between services; and protects the contacts directory of the calling party from direct access by the called party or a third party.

According to an aspect of the invention, the method further includes a step of the OIP application server consulting the database to verify whether the user to which the request to set up a communication session is sent is authorized to access the identity data of the calling party. The calling party can configure their directory of contacts to prohibit certain contacts from accessing their directory for the purposes of personalized identity presentation (e.g. multimedia identity card presentation). Users can therefore further increase their level of security by prohibiting access to their directory by some of their contacts.

Another aspect of the present invention is directed to a system for providing secure access to data stored on a remote content server and accessible from a terminal by means of an electronic address, the system being characterized in that it includes an application server for creating a masking electronic address for a particular validity period and for sending said masking electronic address associated with the electronic address of the remote server to a reverse proxy server, the terminal temporarily accessing the data stored in the content server via the reverse proxy server by means of the masking electronic address.

Like the method described above, the system according to an embodiment of the invention comprises means (application server) for creating an association between the real electronic address of the content server and a masking electronic address and for sending that association to a reverse proxy server making the electronic address of the content server invisible to the client. The application server also controls the validity period of this association to limit access by the terminal of the client to data stored on the content server to a particular time period.

The system according to an embodiment of the invention can be used in an NGN (Next Generation Network) type communications network using packet mode transport technologies. The application server is then an OIP application server and includes means that respond to a calling party sending a communication session request (e.g. an SIP call request) to the terminal of a called party by consulting a database linked to the content server in order to determine the electronic address of the identity data of the calling party that is to be sent to the terminal and by associating the masking electronic address with that electronic address, the two associated electronic addresses being sent to the reverse proxy server.

The OIP application server further comprises means for deactivating the association between the masking electronic address and the electronic address of the remote server in the reverse proxy server either after a predetermined time period (e.g. deactivation of the masking electronic address two seconds after acceptance of the communication session by the called party) or in response to an event in the communications network, for example acceptance of the communication session by the called party or the end of the session.

The directory of the calling party is accessible to the called party to enable presentation of calling party identity information for only a limited time period and via a masking electronic address.

The OIP application server may further comprise means for verifying whether the destination user of the communication session is authorized to access the identity data of the calling party. This enables the called party to prohibit access to their directory by some of their contacts.

Another aspect of the invention is directed to an application server linked to a data transmission network in which data stored on a remote content server is accessible from a terminal by means of an electronic address, the server being characterized in that it includes means for creating a temporary masking electronic address associated with an electronic address of the remote content server and for sending the two associated addresses to a reverse proxy server linked to the terminal.

In a packet mode telecommunications network using the OIP service, the application server further includes means responding to a calling party sending a communication session request to said terminal by consulting a database linked to the content server in order to determine the electronic address of the identity data of the calling party that is to be sent to the terminal and by associating with that electronic address the masking electronic address, the two associated electronic addresses being sent to the reverse proxy server. It further includes means responding either to a temporal event (e.g. deactivation of the masking electronic address two seconds after acceptance of the communication session by the called party) or to an event in the communications network (acceptance of the communication session by the called party or the end of the session) by deactivating the association in the reverse proxy server between the masking electronic address and the electronic address of the remote server.

Another aspect of the invention is directed to a computer program adapted to be executed on an application server as described above and characterized in that it includes instructions for creating a temporary masking electronic address associated with an electronic address of a remote content server and for sending the two associated addresses to a reverse proxy server linked to the terminal.

The program can further include instructions for responding to a calling party sending a communication session request by consulting a database linked to the content server in order to determine the electronic address of the identity data of the calling party that is to be sent and by associating with that electronic address the masking electronic address and instructions for responding either to a temporal event (e.g. deactivation of the masking electronic address two seconds after acceptance of the communication session by the called party) or to an event in the communications network (acceptance of the communication session by the called party or the end of the session) by deactivating the association in the reverse proxy server between the masking electronic address and the electronic address of the remote server.

BRIEF DESCRIPTION OF THE DRAWINGS

Other features and advantages of the invention emerge from the following description of particular embodiments of the invention, provided by way of non-limiting example, with reference to the appended drawings, in which.

DETAILED DESCRIPTION OF THE DRAWINGS

The present invention proposes a solution to protecting access to data stored on a server and accessible via an electronic address that can be of any type and in particular a URL (Uniform Resource Locator) address, an email address, an IP (Internet Protocol) address, a telephone number, etc. The data can be of any type (images, ringtones, video, etc.). Generally speaking, the protection principle of the invention combines the use of a reverse proxy server for masking the real electronic address of the server that provides access to the data, with the use of an application server to control the reverse proxy server in order to create therein a masking electronic address of time-limited validity. Accordingly, as described below in more detail, a user to be given access to the data, can access the data only by using a masking electronic address (i.e. without knowing the real electronic address), and only for a limited time period.

Although this is not limiting on the present invention, the invention is advantageously applied to recent technology for voice and/or data communication sessions, for example SIP (Session Initiation Protocol) type Voice over IP telephone calls. The Session Initiation Protocol is used to create and manage sessions between users to set up Voice over IP (VoIP) type telephone conversations, i.e. using transport (packet transmission) protocols that were previously reserved for transporting data. For example, communication sessions set up between a calling party A and a called party B can be implemented in accordance with the H323 protocol (issued by the ITU (International Telecommunications Union) for IP (session) connection between two points in a communications network).

Figure 1:
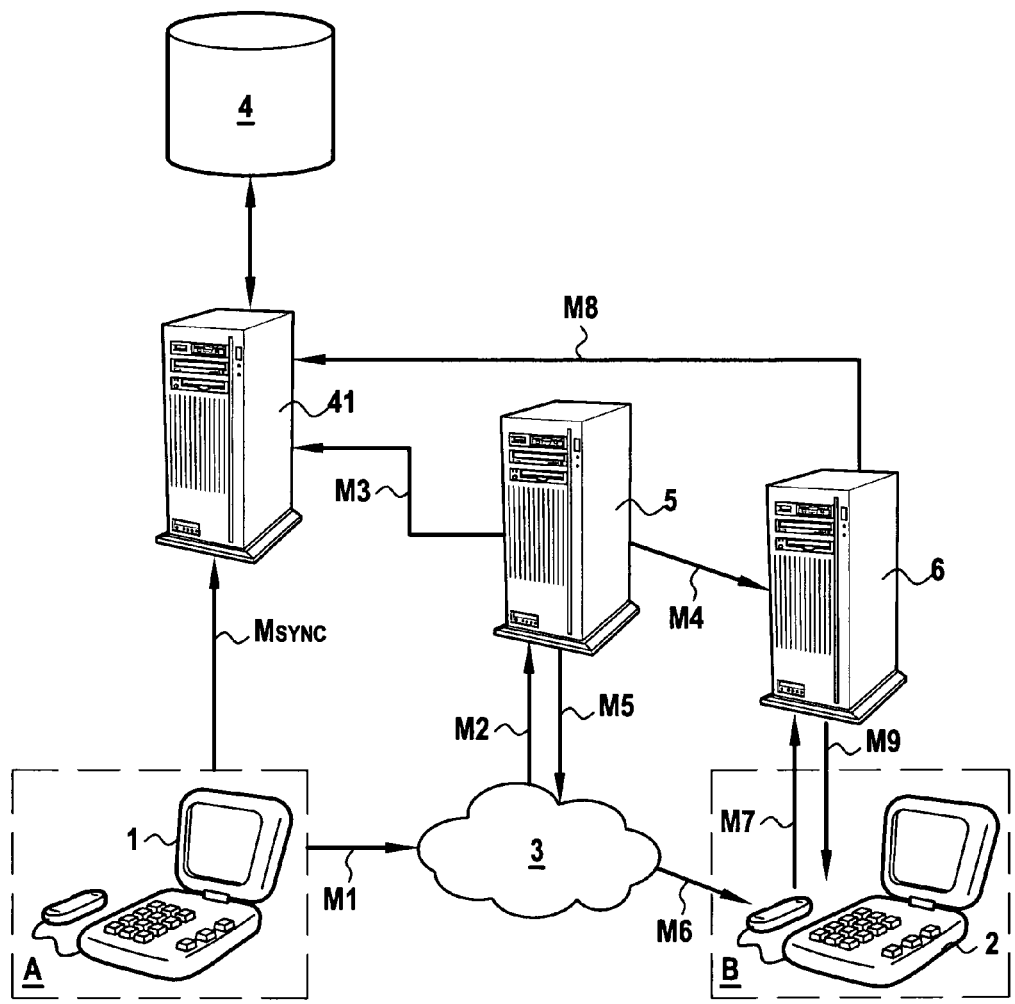
FIG. 1 is a general block diagram of one embodiment of a system of the invention for protecting a server access link.

FIG. 1 shows an architecture of a communication system in which the present invention can be used that offers presentation of calling party identity data. For simplicity in the examples described below, the electronic address is a URL address and the communication session is an SIP call, although this is not limiting on the invention.

The FIG. 1 architecture comprises two terminals 1 and 2 that can be connected to an NGN (Next Generation Network) type network 3. The NGN architecture is a new communications network architecture that uses packet mode transport technologies, previously reserved for data, to transport all telecommunication services. This type of network makes provision in particular for implementing the OIP (Originating Identification Presentation) service enabling identification data of a calling party to be shown on the terminal of a called party during a call. The service for showing OIP identity data is called the CLIP (Calling Line Identification Presentation) service in the PSTN and ISDN and has been standardized by the ETSI in ETSI specification EN 300 089 "Integrated Services Digital Network (IDSN); Calling Line Identification Presentation (CLIP) additional service; Service description". In concrete terms, this service enables a called party, on receiving a call from a calling party, to receive on their terminal a multimedia identity card or calling card of the calling party.

As described in detail in patent applications FR 05 10387 and FR 05 10389, this kind of identity card can in particular include multimedia information such as advertising, a link to a personal site, an avatar, a photo, an audio clip, etc. These cards are created by the calling party and stored with their list of contacts, also known as their NAB (Network Address Book) directory. The calling party associates each identity card that they create with a number of contacts from their NAB directory so that those contacts automatically receive the corresponding card at the time of a call. Sending these cards at the same time as a telephone call is also described in detail in the patent applications referred to above.

The FIG. 1 system further includes an OIP application server 5 on which the OIP service is implemented, a dynamic reverse proxy server 6, and a contacts database 4 accessible by a server 41.

For simplicity, throughout the remainder of the description, the terminals 1 and 2 are considered to belong to a calling party A and to a called party B, respectively. It is further considered that the OIP service is activated at least on the line of the called party B.

According to the invention, the OIP application server 5 manages the OIP service. On reception of a call request (a request to set up a communication session), the OIP application server 5 consults the contacts database 4 via the server 41 to determine the real URL address of the information to be sent to the called party B. It then creates a masking URL address and sends it with the aforementioned information to the dynamic reverse proxy server 6 at the time of activation. This masking URL address is inserted into the call sent to the called party B.

The OIP application server deactivates this association with the dynamic reverse proxy after a predetermined time period (e.g. deactivation of the masking URL address two seconds after acceptance of the SIP call by the called party) or following an event in the network such as acceptance of the SIP call by the called party or at the end of the SIP call when the called party hangs up.

In an A to B OIP identity presentation service, the dynamic reverse proxy server 6 manages the association between the real URL addresses of content servers (here the server(s) 41 hosting the contacts database 4) and the masking URL addresses created by the OIP application server 5.

The OIP application server 5 activates a new association on receiving a call (messages M1 and M2 in FIG. 1). On receipt of a request from the called party B at the masking URL address (message M7), the dynamic reverse proxy server 6 determines the real URL address (message M8) and then forwards the content to the called party B, totally masking the server hosting the real URL address (message M9).

After a predetermined time period or following an event in the network (e.g. the beginning or the end of the communication session), the OIP application server 5 deactivates the preceding association, making the real URL address inaccessible via the masking URL address. The identity data of the calling party, such as their multimedia identity card, sent while the masking URL address is active in the dynamic reverse proxy server 6, can be retained temporarily in the memory of the terminal 2 of the called party B so as to remain displayed on the terminal after deactivation of the masking URL address. The time of activation of the masking URL address and, consequently, of indirect access to the content server, can be reduced to the minimum necessary for the transmission of information to the terminal of the called party, that data then remaining on screen.

Outside its activation period, the masking URL address and, of course, the real URL address are inaccessible to users of the network.

For example, the HTTP Apache server can be configured to implement an HTTP reverse proxy server. Thus it masks private URL addresses by forwarding content from those addresses to remote terminals sending content requests.

Nevertheless, in the context of the invention, this server does not activate and deactivate the public URL address/ private URL address association (here the real URL address/ masking URL address association) as a function of an external event, in particular a SIP call. The association is permanent, and is not a dynamic server. Implementing the dynamic reverse proxy server of the invention further requires control of activation/deactivation of the real URL address/ masking URL address association effected by the OIP application server 5 as described above.

The contacts database 4 contains a list of contacts also known as the NAB (Network Address Book) directory. Data stored in this database (e.g. multimedia identity cards) is accessible via a URL address ("real" URL address).

The database 4 containing the list of contacts of the calling party A handles interactive exchange with the calling party, in particular to create the multimedia identity cards and, where applicable, to set parameters of the identity restriction service for one or more contacts from the list (Msync, FIG. 1). This exchange uses the usual techniques:

interactive voice server (VoiceXML application, or audiovisual tree, or any other automated dialogue technique), which receives user commands in the form of voice frequencies (dual tone multifrequency (DTMF) commands), other computer data or by speech recognition; and/or web page; and/or man-machine interface (graphical server).

This database can be located on the NAB directory server, which is a network directory (e.g. "My Contacts" directory), on the client profile server (e.g. HSS, HLR), on the server of the directory of a business, etc. In all cases, the database is accessible via a real URL address.

The terminals 1 and 2 are adapted to set up a voice and/or data call via the NGN-type network 3. Furthermore, to receive a multimedia identity card, the called party B must use a terminal 2 having means for receiving and displaying multimedia data (e.g. PC, SIP Internet Protocol (IP) telephone, etc.). If the identity restriction service for B has been activated in A's NAB directory, the identity of A will not be shown to B regardless of which terminal B uses.

An example of the use of the present invention is described next, still with reference to FIG. 1, and relates to temporary access by the called party B to the NAB directory of the calling party A to enable presentation of the identity of A to B when sending an SIP call from A to B.

The calling party A sends the network 3 (e.g. an NGN network) a request to call the called party B (SIP messages M1), which responds by calling the OIP data presentation service (SIP messages M2) implemented on the OIP application server 5.

The OIP application server 5 consults the contacts database 4 to find A's network (NAB) directory and to determine whether the called party B is entitled to access it (XCAP (XML Configuration Access Protocol)/HTTP (HyperText Transfer Protocol) messages M3).

Knowing the real URL address of the base 4 on which A's NAB directory is located, the OIP application server 5 associates that URL address with a masking URL address. It then sends this association to the dynamic reverse proxy server 6 (XML/HTTP messages M4).

The OIP application server 5 then sends a message to the network 3 (SIP messages M5) which contacts the called party B (SIP messages M6). The two messages M4 and M5 contain the masking URL address for accessing the dynamic reverse proxy server 6 and thus the information about A in the NAB for this call.

The called party B contacts the dynamic reverse proxy server 4 via this masking URL (HTTP messages M7).

Using the real URL address of the NAB directory that the dynamic reverse proxy server knows, it consults A's NAB directory (HTTP messages M8). It then returns the identity information contained in A's NAB directory to the called party B (HTTP messages M9), which information is notified to B via the display of the terminal 2.

Figure 2:
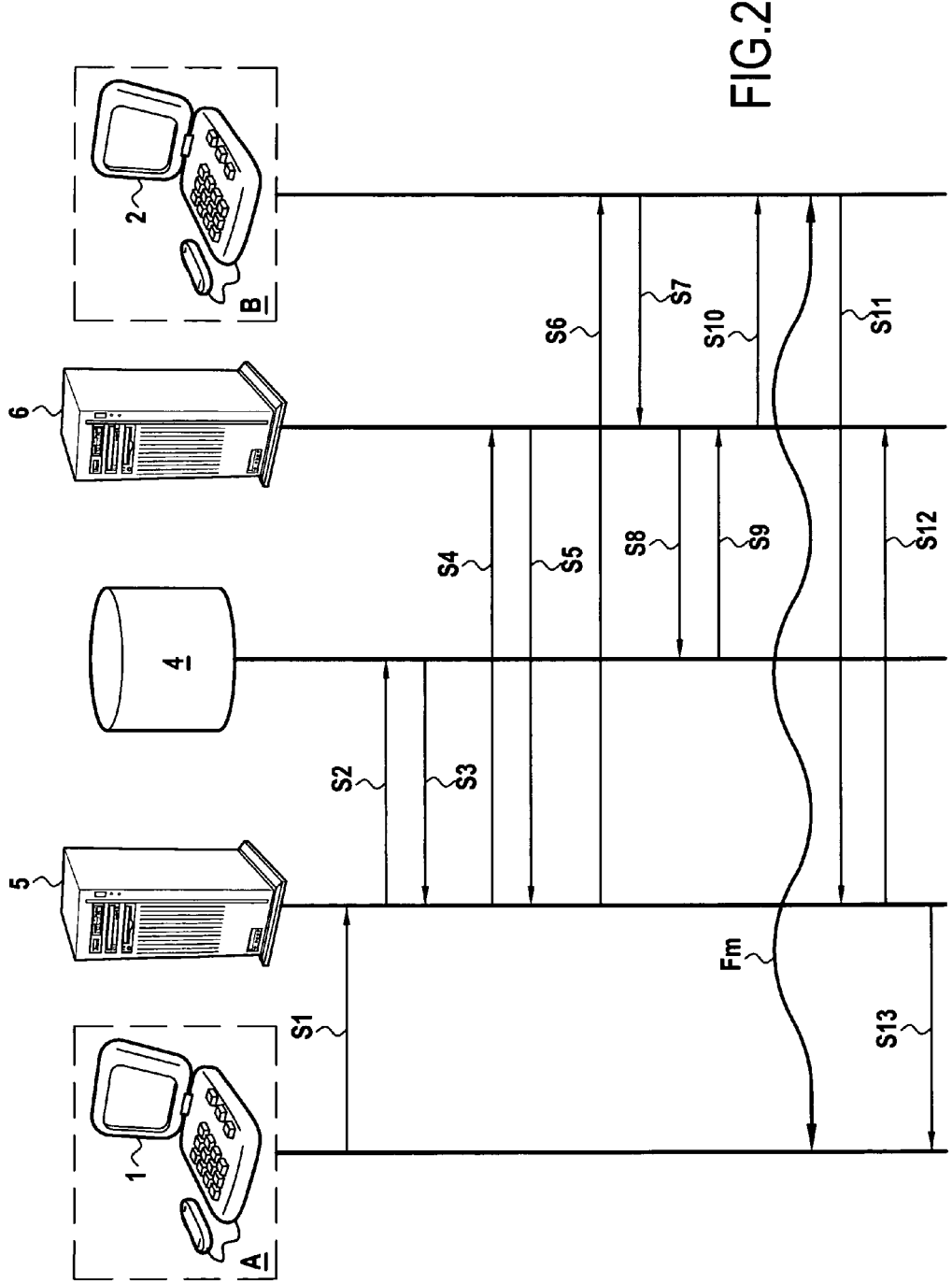
FIG. 2 shows a first example of use in a system of the invention for protecting an access link to a server.

FIG. 2 shows the steps of the method of the invention executed in the FIG. 1 system (corresponding to messages exchanged in a multimedia stream Fm between the various components of the system) at the time of an SIP call from A to B, B being entitled to be connected to A's NAB directory during the call.

As described above, when A sends a call to B (step S1), the OIP application server 5, using the real URL address of the contents database 4, sends an enquiry to determine whether B is authorized to access the identity information of A's NAB directory (step S2). The contacts database 4 sends back a message indicating that B is authorized to access A's NAB directory (step S3). As soon as it receives the response, the OIP application server 5 creates the association between "created masking URL address" and the "real URL address of the NAB directory" for the duration of the call, which it sends to the dynamic reverse proxy server 6 (step S4). After acknowledgement of reception of this association by the server 6 (step S5), the call from A is forwarded to B using the masking URL address, enabling B's terminal 2 to access A's identity information contained in A's NAB directory for this call (step S6). To obtain this information, B's terminal 2 sends the dynamic reverse proxy server 6 a request using the masking address (step S7). The dynamic reverse proxy server redirects the request to the contacts database 4 using its real URL address (step S8). The database 4 responds by sending the identity information (e.g. a multimedia identity card) of A that is available in the NAB directory (step S9) back to the dynamic reverse proxy server 6, which redirects it to B's terminal 2 (step S10).

When B hangs up (step S11), the OIP application server 5 connects to the dynamic reverse proxy server 6 to deactivate the association between the "created masking URL address" and the "NAB directory real URL address", thereby terminating access by B's terminal 2 to the information in A's NAB directory on the database 4 (step S12). The OIP application server 5 finally informs A's terminal 1 that B has hung up and that the call has ended. As described above, deactivation of the association between the "created masking URL address" and the "NAB directory real URL address" can also be initiated after a predetermined time period (e.g. deactivation of the masking URL address two seconds after acceptance of the SIP call by the called party) or following an event in the network, for example acceptance of the SIP call by the called party.

Figure 3:
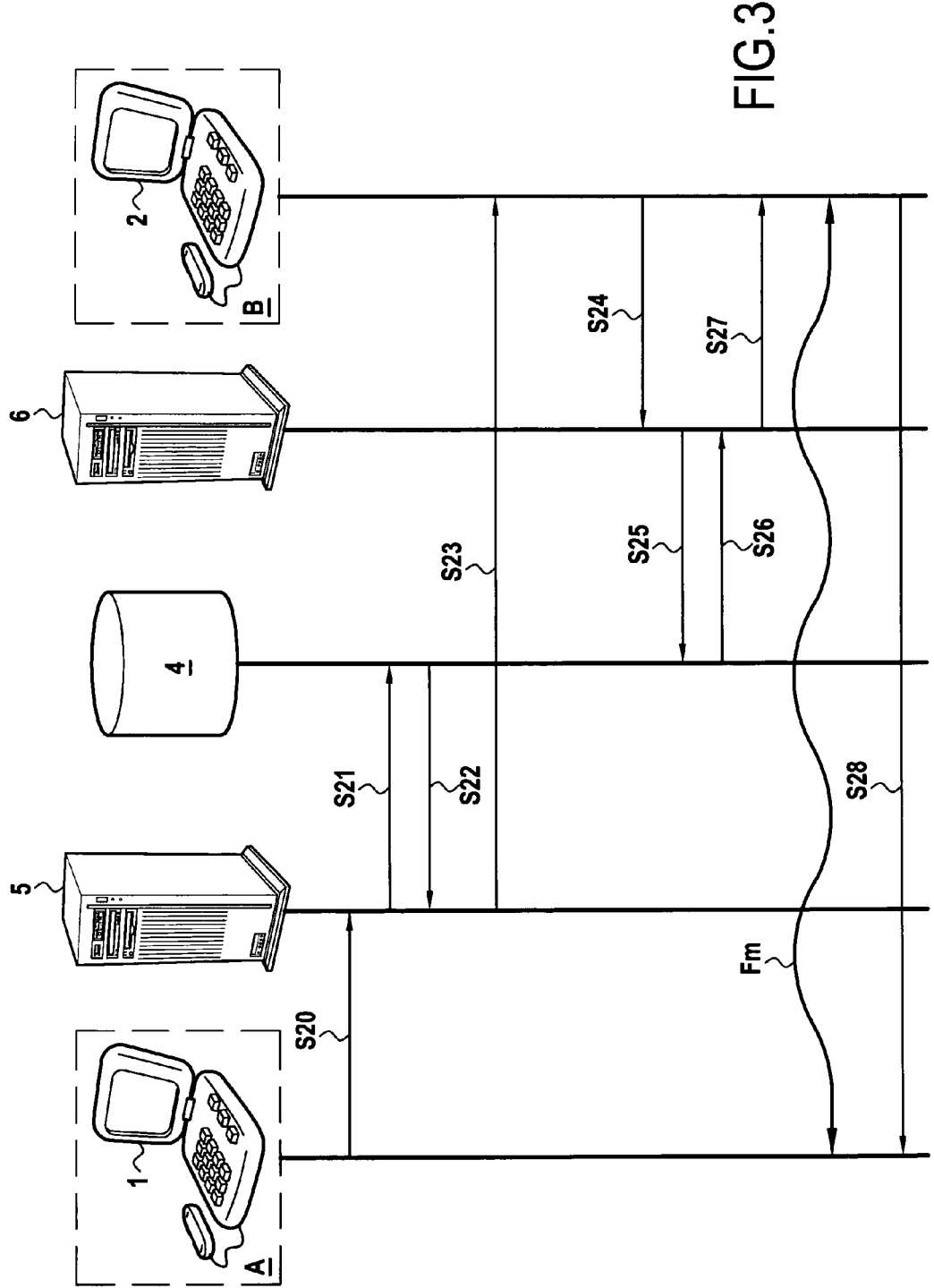
FIG. 3 shows a second example of use in a system of the invention for protecting an access link to a server.

FIG. 3 shows the steps corresponding to exchanges of messages in a multimedia stream Fm between the various elements of the system executed in the FIG. 1 system at the time of an SIP call from A to B, when B is not entitled to be connected to A's NAB directory. In this example, A has not activated the OIR (Originating Identification Restriction) service for preventing presentation of the identity of the calling party in a standard OIP service. That service is implemented by the OIP application server 5 at the request of A from the terminal 1 (FIG. 1, messages Msync). This service relates to raw identity data that is not multimedia data, not personalized and different from that available in A's NAB directory, which A has personalized for each of the members of A's contact list.

When A sends a call to B (step S20), using the real URL address of the contents database 4, the OIP application server 5 sends an enquiry to determine whether B is authorized to access the identity information in A's NAB directory (step S21). The contacts database 4 sends back a response indicating that B is not authorized to access A's NAB directory (step S22).

The call from A is then sent to B's terminal 2 but with no masking URL address (step S23). B's terminal 2 cannot access A's identity information of A contained in A's NAB directory.

To be more precise, B's terminal 2 sends a request to the dynamic reverse proxy server 6 in order to attempt to obtain a masking address enabling it to access A's personalized identity information (step S24). The dynamic reverse proxy server 6 redirects the request to the contacts database 4 (step S25). The database 4 sends back a negative response "information does not exist or is prohibited" to the server 6 (step S26), which redirects it to B's terminal 2 (step S27).

However, with an OIP service, since A has not activated the OIR restriction service, A's identity could nevertheless be shown to B. That identity does not correspond to A's personalized multimedia identity data in A's NAB directory (e.g. A's personalized identity card) but to basic identity data about A (i.e. A's name, telephone number and email address, which is not multimedia data and has not been customized as a function of B) as supplied by the OIP service standardized by the ETSI (European Telecommunications Standard Institute).

The call therefore continues until the end of the SIP call (step S28).

Figure 4:
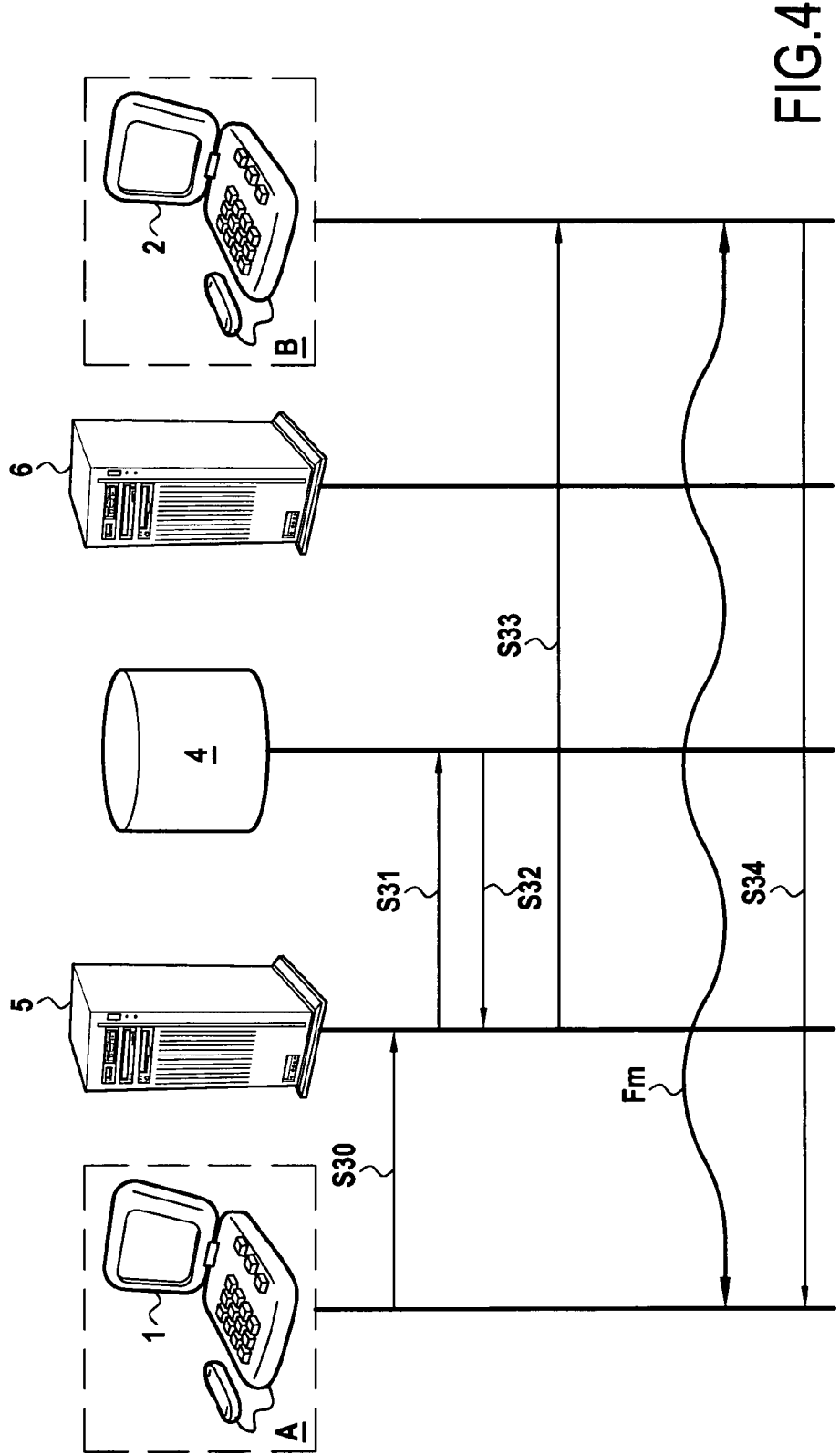
FIG. 4 shows a third example of use in a system of the invention for protecting an access link to a server.

FIG. 4 shows the steps corresponding to exchanges of messages in a multimedia stream Fm between the various elements of the system executed in the FIG. 1 system at the time of an SIP call from A to B, when A has activated the OIR (Originating Identification Restriction) service which prevents the presentation of the identity of the calling party in a standard OIP service.

When A sends a call to B (step S30), using the real URL address of the contents database 4, the OIP application server 5 sends an enquiry to determine whether B is authorized to access identity information in A's NAB directory (step S31). The contacts database 4 sends back a response indicating that A has activated the OIR service (step S32).

The call from A is then forwarded to B's terminal 2 (step S33) but no identity information about A is presented.

The call therefore continues until the end of the SIP call (step S34).

Note that if A activates the OIR service, B cannot obtain any information, whether derived from raw identity data (i.e. A's name, telephone number and email address, which is not multimedia data and has not been customized as a function of B) as supplied by the OIP service standardized by the ETSI, or from A's personalized multimedia identity data in A's NAB directory (e.g. A's identity card personalized as a function of B).

The invention claimed is:

1. A method of providing secure access to data stored on a remote content server and accessible from a first terminal to which said data is to be provided by utilizing an electronic address, the method comprising the following:
   a) creating in a reverse proxy server and for a given validity period a masking electronic address associated with an electronic address of the remote content server, said creation of said masking electronic address being initiated in response to a sending of a request by a second terminal to set up a communication session to the first terminal; and
   b) communication of the masking electronic address to the first terminal by the reverse proxy server wherein the electronic address of the remote content server is always unknown to the first terminal, wherein said method further comprises deactivating the masking electronic address in the reverse proxy server after a predetermined time period or in response to an event in the communication session.

2. The method according to claim 1, wherein the creation of said masking electronic address in said reverse proxy server further comprises an OIP (Originating Identification Presentation) application server responding to a calling party sending the request to set up the communication session to the first terminal by consulting a database linked to the remote content server in order to determine an electronic address of identity data of the calling party that is to be sent to the first terminal and by associating the masking electronic address with that electronic address, the two associated electronic addresses being sent to the reverse proxy server.

3. The method according to claim 2, further comprising consultation of the database by said OIP application server to verify whether a user to which the request to set up the communication session is sent is authorized to access the identity data of the calling party.

4. An application server comprising:
   hardware and software, said application server being linked to a data transmission network in which data stored on a remote content server is accessible from a first terminal to which said data is to be provided by utilizing an electronic address, the application server being configured to create, in a reverse proxy server, a temporary masking electronic address associated with an electronic address of the remote content server, said creation of said masking electronic address being initiated in response to a sending of a request by a second terminal to set up a communication session to the first terminal; said application server also being configured to send the two associated addresses to a reverse proxy server linked to the first terminal, wherein the electronic address of the remote content server is always unknown to the first terminal, said application server also being configured to deactivate the masking electronic address in the reverse proxy server after a predetermined time period or in response to an event in the communication session.

5. The application server according to claim 4, wherein the application server is an OIP (Originating Identification Presentation) application server, configured to respond to a calling party sending the request to set up the communication session to the first terminal by consulting a database linked to the remote content server in order to determine an electronic address of identity data of the calling party that is to be sent to the first terminal and by associating the masking electronic address with that electronic address, the two associated electronic addresses being sent to the reverse proxy server.

6. A non-transitory computer-readable medium storing a computer program including instructions that when executed by a processor perform a method of providing secure access to data stored on a remote content server and accessible from a first terminal to which said data is to be provided by utilizing an electronic address, the method comprising:
   a) creating in a reverse proxy server and for a given validity period a masking electronic address associated with an electronic address of the remote content server, said creation of said masking electronic address being initiated in response to a sending of a request by a second terminal to set up a communication session to the first terminal; and
   b) communication of the masking electronic address by the reverse proxy server to the first terminal, wherein the electronic address of the remote content server is always unknown to the first terminal, wherein said method further comprises deactivating the masking electronic address in the reverse proxy server after a predetermined time period or in response to an event in the communication session.

7. A system for providing secure access to data stored on a remote content server and accessible from a first terminal to which said data is to be provided by utilizing an electronic address, the system comprising:
   an application server comprising hardware and software, said application server being configured to create in a reverse proxy server and for a given validity period a masking electronic address associated with an electronic address of the remote content server, said application server also being configured to create said masking electronic address in response to a sending of a request by a second terminal to set up a communication session to the first terminal and to deactivate the masking electronic address in the reverse proxy server after a predetermined time period or in response to an event in the communication session;
   and said reverse proxy server, said reverse proxy server being configured to communicate the masking electronic address to the first terminal such that the electronic address of the remote content server is always unknown to the first terminal.

* * * * *